United States Patent [19]

Golubic

[11] Patent Number: 5,026,158

[45] Date of Patent: Jun. 25, 1991

[54] APPARATUS AND METHOD FOR DISPLAYING AND STORING IMPACT POINTS OF FIREARM PROJECTILES ON A SIGHT FIELD OF VIEW

[76] Inventor: Victor G. Golubic, 3321 W. Orchid La., Phoenix, Ariz. 85051

[21] Appl. No.: 219,567

[22] Filed: Jul. 15, 1988

[51] Int. Cl.$^5$ ............................................. G02B 23/10
[52] U.S. Cl. ........................................ 356/252; 42/100
[58] Field of Search ................. 356/252; 42/100, 101, 42/103; 434/20

[56] References Cited

U.S. PATENT DOCUMENTS

| | | |
|---|---|---|
| 3,498,691 | 3/1970 | Razclow . |
| 3,682,552 | 8/1972 | Hartman . |
| 3,688,408 | 9/1972 | Smith et al. . |
| 3,749,494 | 7/1973 | Hodges . |
| 3,938,875 | 2/1976 | Ruder . |
| 3,948,587 | 4/1976 | Rubbert . |
| 3,960,453 | 6/1976 | Svensson et al. . |
| 4,263,219 | 4/1981 | Murdoch . |
| 4,530,162 | 7/1985 | Forrest et al. . |
| 4,554,744 | 11/1985 | Huckenbeck . |
| 4,561,204 | 12/1985 | Binion . |

FOREIGN PATENT DOCUMENTS 2041177 9/1980 United Kingdom ................. 434/20

Primary Examiner—Davis L. Willis
Assistant Examiner—Matthew W. Koren
Attorney, Agent, or Firm—William W. Holloway

[57] ABSTRACT

Apparatus and method for determining and recording a calculated impact point of one or more projectiles discharged from a firearm include a sighting mechanism with a field of view display unit, sensor elements, a recording unit, and a trajectory calculating microprocessor unit, the microprocessor unit for storing parameter data and for responding to sensor and/or manual data input signals and modifying the image presented by the field of view display unit. The trajectory calculating microprocessor unit, in response to the sensor data and parameter data, determines the trajectory of a projectile. The calculated impact point of the projectile is used to superimpose an indicia, namely an impact point-reticle on the image of the field of view of the display unit relative to the zero-range reticle or standard cross-hair setting.

19 Claims, 3 Drawing Sheets

APPARATUS AND METHOD FOR DISPLAYING AND STORING IMPACT POINTS OF FIREARM PROJECTILES ON A SIGHT FIELD OF VIEW

RELATED DOCUMENT

This application is related to Disclosure Document No. 192294.

BACKGROUND OF THE INVENTION

1. Field of the Invention

This invention relates generally to firearms and weapons that operate by propelling a projectile toward a target point. The invention eliminates the need for using live ammunition during the hunting and/or target acquisition activity and can provide a visible record of the result of discharging a projectile.

2. Description of the Related Art

In the past, a large amount of activity has been devoted to improving the sighting apparatus for rifles, firearms and the like. In U.S. Pat. No. 3,498,691 entitled PARALLAX-FREE TELESCOPIC SIGHT, a sighting apparatus is described in which an optical system compensates for the parallax resulting from the distance between the sighting apparatus and the barrel of a firearm In U.S. Pat. No. 3,682,552 entitled RANGE FINDER TO CONTINUOUSLY DETERMINE RANGE UTILIZING A RETICULE HAVING INDICIA, a beam of light associated with the sighting apparatus is used in conjunction with marking in the sight reticle to establish target range. In U.S. Pat. No. 3,688,408 entitled RANGE AND ELEVATION DETERMINING DEVICE, markings on the reticle can be used with a target of known dimensions to determine distance and range information, including ballistic characteristics of the ammunition being used. In U.S. Pat. No. 3,749,494 entitled GUN SIGHTING AND RANGING MECHANISM, a sighting apparatus includes an optical system in which the alignment of two images provides a range determination. The ranging function can be combined with the tilt of the rifle relative to the firearm barrel to compensate for the projectile trajectory. In U.S. Pat. No. 3,938,875 entitled SIGHT FOR USE ON HAND FIREARMS AND A METHOD OF USING IT, a luminous sighting spot is provided in the same optical image as target image. In U.S. Pat. No. 3,948,587 entitled RETICLE AND TELESCOPIC GUNSIGHT SYSTEM, a plurality of apertures associated with the sighting apparatus is used to determine a range of a target of known dimensions. In addition, the sighting apparatus includes a plurality of adjustment mechanisms for entering environmental information. In U.S. Pat. No. 3,960,453 entitled ELECTRONIC TELESCOPIC SIGHT, sighting apparatus is described in which an array of light emitting diodes (LEDs) can be adjusted to follow a moving target and, when the distance to the target is known, the required "lead" for the target can be illuminated. In U.S. Pat. No. 4,263,719 entitled OPTICAL SIGHTING DEVICES, markings on the reticle provide the range for a target of known dimensions. In U.S. Pat. No. 4,530,162 entitled APPARATUS AND METHOD FOR BORESIGHTING A FIREARM, a beam of coherent radiation is passed through the barrel of a firearm, and the sighting apparatus, using the point illuminated by the coherent radiation, can adjust the sighting apparatus In U.S. Pat. No. 4,554,744 entitled SWITCH ASSEMBLY FOR RIFLESCOPE, a mechanism for providing illuminated cross-hairs (aiming-point) in the reticle improves the targeting function in low light levels. In U.S. Pat. No. 4,561,204 entitled RETICLE DISPLAY FOR SMALL ARMS, a reticle display device is coupled to a sighting apparatus for simultaneous viewing by the eye not observing the target. The images viewed by the two eyes are integrated, the reticle display device providing aiming cross-hairs responsive to transducers gathering information with respect to environmental conditions.

The extensive activity related to sighting and ranging apparatus associated with rifles, firearms, and the like has resulted in improved apparatus for hunting. However, as the number and efficiency of hunters has increased, the amount of actual hunting that can be permitted without impacting the wildlife population has diminished. To provide the hunting experience without actual injury to the animals, a need has been felt for firearms and related sighting apparatus that can permit a simulated hunting experience in a manner harmless to the target species while still providing verification of the success in tracking the animals. Similarly, a need has been felt for a firearm/sighting apparatus combination that can provide a technique for training operators which includes a permanent record of the result of the operation of a firearm. Moreover, for the experienced hunter, comparison over time between the actual firings and the permanent record will build a confidence against the need to fire the missile to gain equivalent satisfaction of acquiring the target.

FEATURES OF THE INVENTION

It is an object of the present invention to provide improved sighting apparatus for use with a firearm.

It is a feature of the present invention to provide an image for sighting on a target by a rifle or the like that includes a marker, referred to in this patent as an impact-point reticle when displayed, indicating where the projectile discharged from the rifle will impact relative to the zero-range reticle.

It is another feature of the present invention to display on an image of a firearm sighting apparatus an impact point, the impact point resulting from the computation of a projectile trajectory that includes characteristics of the projectile and influences by environmental conditions such as humidity, temperature, barometric pressure, angle of elevation, wind velocity, and direction upon the projectiles.

It is yet another feature of the present invention to provide apparatus for determining an impact point of projectile with respect to a moving target.

It is still another feature of the present invention to permit a user to simulate the conditions of hunting and similar activity without the use of projectiles.

It is a further feature of the present invention to provide a sighting apparatus that will provide a record of skills with a firearm without the actual discharge of the firearm by recording these calculated impact points on stored field of view images.

It is a still further feature of the present invention to provide a sighting apparatus that can assist the user in developing the skills in the use of firearms.

It is yet another feature of the present invention to provide a technique for comparing impact points for a plurality of different cartridges under the same conditions.

SUMMARY OF THE INVENTION

The aforementioned and other features are attained, according to the present invention, by providing the sighting apparatus for a firearm with a trajectory calculating microprocessor unit, an optical image conversion unit such as a charge coupled device or suitable integrated circuit, a recording unit, a range finder associated with the trajectory calculating microprocessor unit, a zoom lens also associated with the trajectory calculating microprocessor unit, a plurality of sensors automatically supplying the trajectory calculating microprocessor unit with environmental conditions, an entry device to enter parameter data into the trajectory calculating microprocessor unit, and a plurality of control switches. An adjustment mechanism permits the field of view of the sighting apparatus to be adjusted relative to the barrel of the firearm. The field of view on the optical image conversion unit, associated with the recording and display units, provides a display device that can display the image seen through the zoom lens and the optical range finder. In addition, the trajectory calculating microprocessor unit is coupled to the display unit and can impose selected images thereon. The adjustment mechanism manually calibrates the firearm bore sight, aligning predetermined zero ranges, to the impact point of the projectiles. The trajectory calculating microprocessor unit includes a program for determining, based on the parameters applied to the trajectory calculating microprocessor unit and the characteristics of the projectile, the point of impact of the projectile. The calculation of the projectile point of impact is made relative to the field of view of the zoom lens and the impact point is displayed as an impact-point reticle on the image presented to the observer by combining signals from the trajectory calculating microprocessor unit with signals providing an image to be displayed on the display/recording unit. A second image can be automatically recorded at the calculated time of impact, and a comparison of the images can indicate the success in target acquisition.

These and other features of the invention will be understood upon reading of the following description along with the drawings.

BRIEF DESCRIPTION OF THE DRAWINGS

FIG. 7 illustrates the images displayed on the sighting apparatus display 31 in the moving target mode of operation, FIG. 7A illustrating the image at the time the rifle is discharged, while FIG. 71B illustrates the image of the sighting apparatus display at the time of projectile impact.

DESCRIPTION OF THE PREFERRED EMBODIMENT

1. Detailed Description of the Figures

Figure 1:
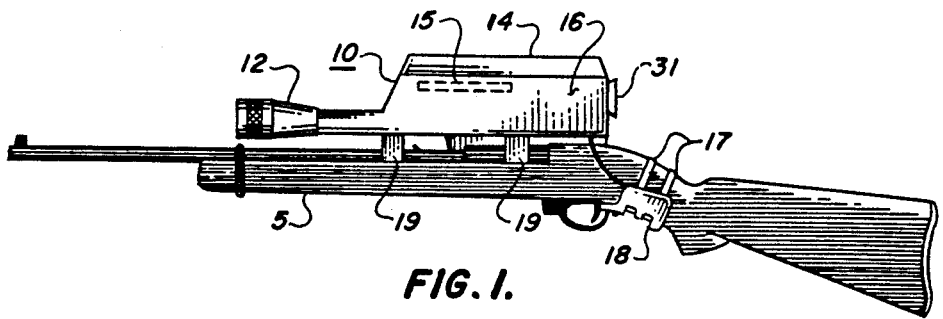
FIG. 1 is a side view of the sighting and recording apparatus of the present invention coupled to a rifle according to the preferred embodiment.

Referring now to FIG. 1, the coupling of a sighting apparatus 10 of the present invention to a rifle 5 or similar device is shown. The sighting apparatus 10 includes a zoom lens 12 and an image recording unit housing 16. The housing 16 includes a trajectory calculating microprocessor unit, at least a portion 15 of which can be detachably coupled to the housing 16 (and electrically coupled to the trajectory calculating microprocessor unit). Also electrically coupled to the trajectory calculating microprocessor unit are environmental sensors located in portion 14 of the housing. A control unit 18 is coupled to the rifle stock by straps 17 and is also electrically coupled to the trajectory calculating microprocessor unit. The control unit 18 is typically located in the vicinity of the rifle trigger for convenient manual access by an operator. The orientation of the sighting apparatus 10 with respect to the rifle 5 can be manually controlled by adjusting mechanisms 19.

Figure 2:
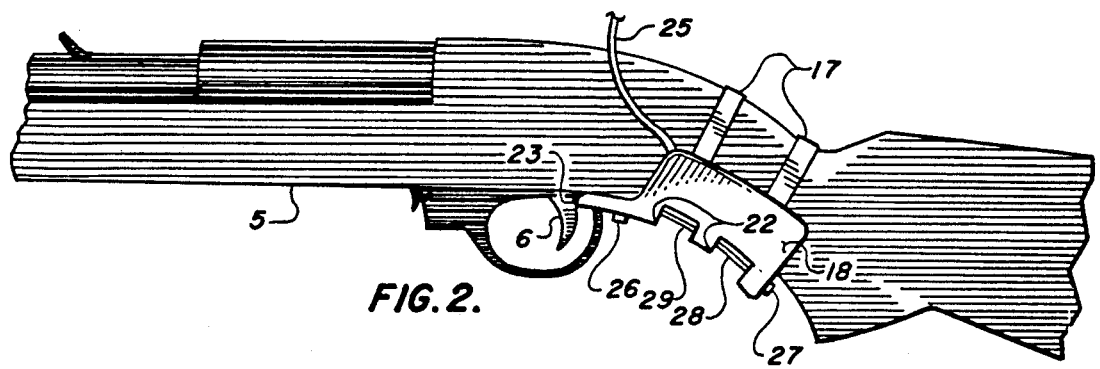
FIG. 2 illustrates the structure of the control unit according to the preferred embodiment.

Referring next to FIG. 2, the control unit 18 is mechanically attached to the stock of the rifle 5 in the vicinity of the trigger 6 by means of fasteners 17. The control unit 18 is coupled to the components of housing 16 of FIG. 1 by means of cable 25. Switch 23 is coupled to the trigger 6 and communicates to the trajectory calculating microprocessor unit when the trigger is activated (pulled). Impact switch 26 activates a "moving target" mode of operation, a mode that permits comparison between the estimated impact point when the trigger is pulled and with the actual location of a moving target relative to this impact point (the difference being a result of the time of flight of the projectile). Display switch 27 controls two display modes associated with the field of view. The first display mode continuously displays the impact point on the field of view of the sighting apparatus. The second display mode displays the impact-point reticle on the field of view only after the trigger mechanism is activated. Zoom knob 28 controls the adjustment of zoom lens 12 of FIG. 1, while focus knob 29 provides the adjustment of a range determination apparatus. Associated with both zoom knob 28 and focus knob 29 are activating switches 22. Activating switches 22, in the preferred embodiment, include a light emitting diode and a radiation sensing diode. When the radiation between the light-emitting diode and the sensing diode is interrupted, for example by a finger manipulating the associated turn knob, the signal(s) transmitted from the optical image conversion unit of the associated range finder in housing 16 will then be displayed on the rangefinder display 63 in FIG. 6.

Figures 3, 4, 5, 6:
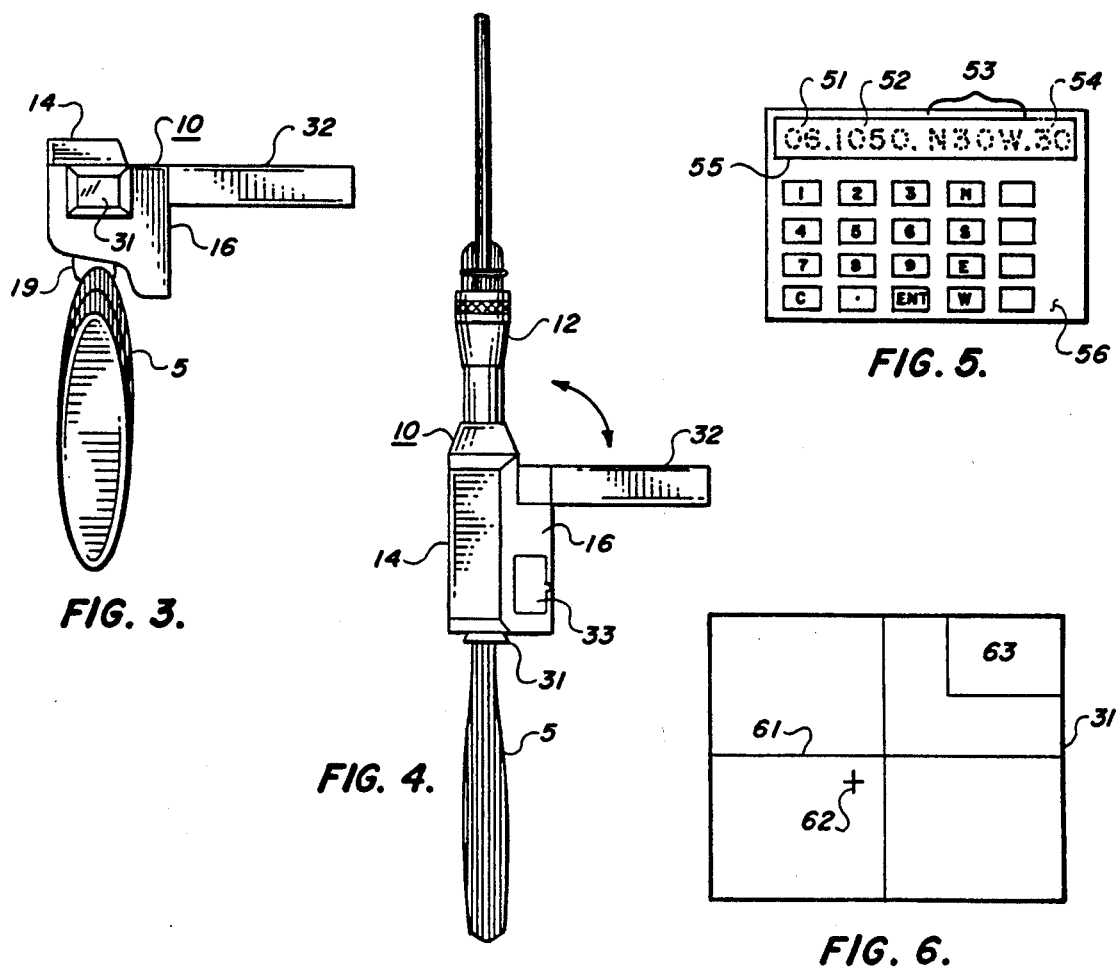
FIG. 3 is a rear view of the rifle and the coupled sighting apparatus.
FIG. 4 is a top view of the rifle and the sighting apparatus of the present invention.
FIG. 5 illustrates an interface unit for entering data into and for displaying data stored in a trajectory calculating microprocessor portion of the sighting apparatus.
FIG. 6 illustrates a display provided by the sighting apparatus.

Referring next to FIG. 3, a rear view of the rifle 5 and the sighting apparatus 10 is shown. The barrel or receiver of the rifle 5 has the sighting apparatus 10 coupled thereto by adjusting mechanisms 19. The compartment 14 houses the environmental sensors is on the upper portion of the housing 16. The image field 31, provided by the sighting apparatus, is visible to the operator of the rifle 5 in the normal sighting position. An optical range finder 32, of the type commonly available requiring the parallax focusing of two like images (cf. The Way Things Work, Simon and Schuster, New York, 1967), extends to one side of the sighting apparatus housing 16.

Referring next to FIG. 4, a top view of the rifle 5 and the sighting apparatus 10 is shown. The compartment 14 housing the environmental sensors is visible along with the zoom lens 12. The optical range finder 32 extends out from the housing 16, the housing 16 containing the trajectory calculating microprocessor unit, the image recording and display unit, and the optical image converting unit. In the preferred embodiment, the optical range finder is moved into a position parallel to the rifle 5 for more convenient storage and for transportation. Cover plate 33 in housing 16 protects a microprocessor entry/display interface unit (shown in FIG. 5).

Referring next to FIG. 5, an entry/display interface unit 56 for providing an interface with the trajectory calculating microprocessor unit contained in housing 16 of the preferred embodiment. In the data display 55 of the interface unit 56, a projectile select display 51, a projectile load (i.e., muzzle velocity) select display 52, a wind direction display 53 and a wind velocity display 54 can be provided. The interface unit 56 can have a plurality of interface keys, including a key to use a preselected configuration as well as a key entry of the desired zero range distance to which the zero-range reticle cross-hairs may be calibrated when using the apparatus to sight and record while using live ammunition.

Referring next to FIG. 6, the display 31 for sighting the rifle provided to the rifle operator by the present invention is shown. In addition to the actual target area image provided through the zoom lens 12, the display 31 can include the zero range reticle cross-hairs 61 or any configuration of reticle structure, an impact-point reticle display point 62 and a portion 63 of the display which can display the images developed by the optical range finder 32, the range finder 32 having an optical image conversion unit of its own and provides this image on the display screen in portion 63 of FIG. 6.

Referring next to FIG. 7, the images provided by the sighting apparatus display 31 are illustrated in the bubbled areas. When the moving target mode of operation is selected by impact switch 26, the sighting apparatus display provides a split screen 71A and 71B. The first screen 71A displays the target field of view with the zero range-reticle cross-hairs 61 and the impact point reticle display point 62. When the operator activates the trigger 6 of the rifle, the switch 23 transmits an appropriate signal to the trajectory calculating microprocessor unit. The trajectory calculating microprocessor unit responds by freezing the target image 72 displayed on the screen 71A at the time the projectile 78 is discharged from the rifle barrel. The rifle operator can continue sighting the target, even though the target 74 is moving, on the second screen 71B. The trajectory calculating microprocessor unit calculates the time for the projectile 78 to reach the target, assuming that the several parameters required for such a calculation are correct. At the calculated time, the microprocessor generates a signal freezing and storing the image 73 on the second screen. Comparison of the target image 73 with target image 72 can indicate if the projectile actually impacted the selected target. This will be explained in more detail later.

Figure 8:
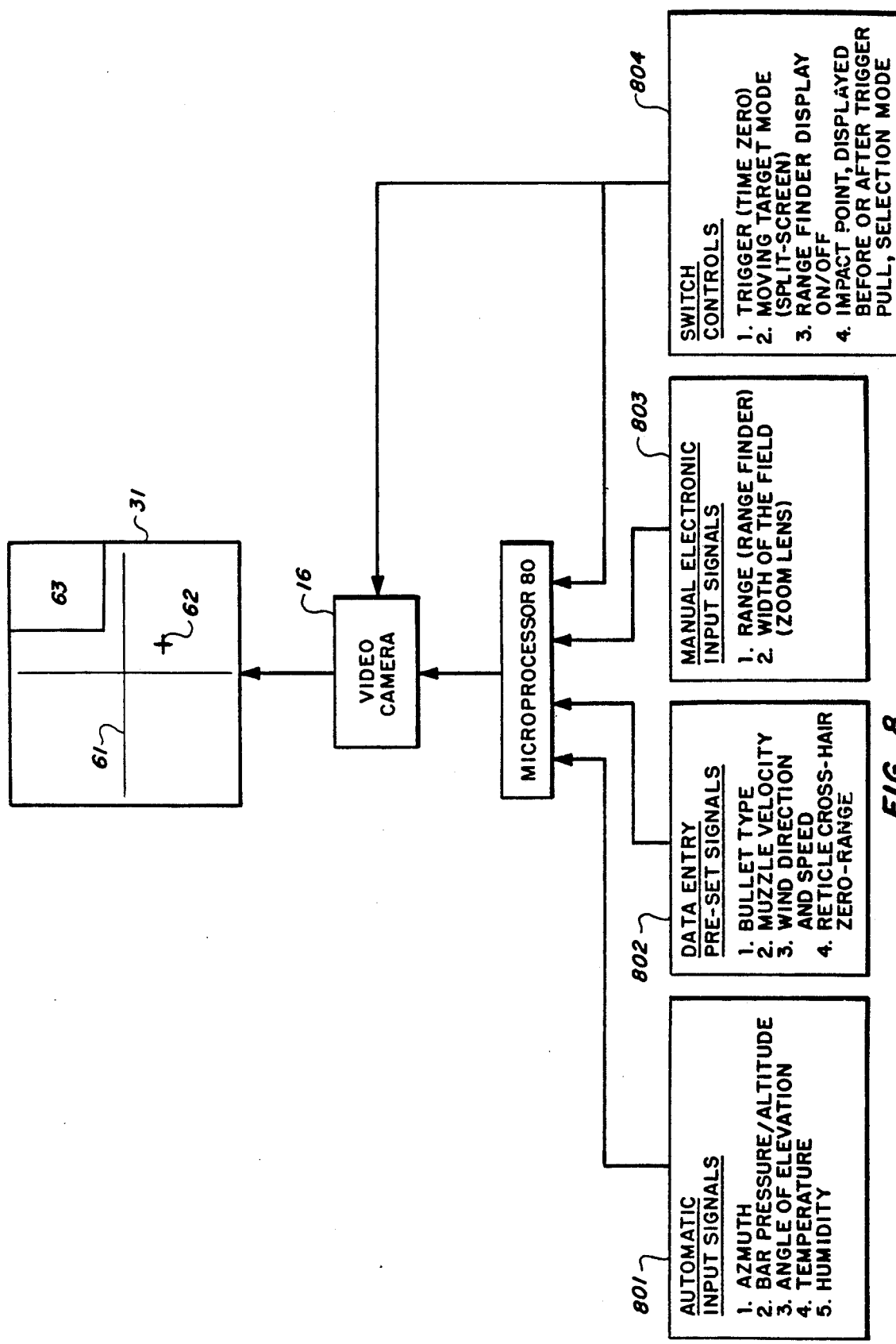
FIG. 8 illustrates the flow of information to and from the trajectory calculating microprocessor unit.

Referring to FIG. 8, the flow of information to and from the trajectory calculating microprocessor unit 80 is shown. The inputs signals to the trajectory calculating microprocessor unit can be grouped into four categories; 1) automatic input signals 801, 2) data entry preset signals 802, 3) manual electronic input signals 803 and 4) switch signals 804. The automatic input signals 801 include, for example, signals from the sensor elements which provide signals identifying the azimuth of the firearm, the barometric pressure/altitude of the firearm, the angle of elevation of the muzzle of the firearm, the ambient temperature and the ambient humidity. Each of these sets of signals provide information concerning parameters, which determine the trajectory of a projectile fired from the firearm and which can be monitored by sensor elements. The data entry preset signals 802 are data signal groups stored in memory locations associated with the trajectory calculating microprocessor unit 80. These data signal groups store information, for example, relating to the parameters of various bullet types, including muzzle velocities, etc.; relating to wind direction and speed; and relating to the reticle cross-hair zero range. The entry of some of these parameters is accomplished by data entry device 56. Other data signal groups can be made available to the trajectory calculating microprocessor unit via programmable read only memories or similar data storage devices. The manual electronic input signals 803 include range signals and the field of view dimension. The range data signals are provided to the trajectory calculating microprocessor unit 80 during the manipulation of the range finder by electronic signals originating from the range finder at turn knob 29 of FIG. 2. Similarly, as a result of manipulation of the zoom lens, data signals are provided to the trajectory calculating microprocessor unit that identify the parameters of the field of view namely, the width of the field at the plane of the target object The switch signals 804 provide the trajectory calculating microprocessor unit 80 with information concerning the activation of the trigger, the selection of the moving target mode, the rangefinder display and the mode for display of the impact point of the projectile. The image recording unit, referred to in the drawings as a video camera 16 controls the field of view 31 seen by the operator of the firearm and controls the optical image conversion unit, the recording unit and the display unit, i.e., the basic components of the commercially available video cameras with the possible addition of a electronic frame grabber. The zero-range reticle 61 provides the firearm bore sight alignment, i.e. the zero range impact point. The bore sight alignment is accomplished by correcting the control 19 in response to an actual projectile impact point of any desired zero range. The field of view 31 displays the optical rangefinder image upon activation of the appropriate switch, the range or distance being determined by proper juxtaposition of two images in the preferred embodiment. After the range has been determined, the rangefinder image can be turned off by easily removing one's finger from the control knob 29 to permit the entire field of view to be devoted to target acquisition. The switch controlling the impact point display selects a mode where the projectile impact point is continuously displayed or a mode where the projectile impact is displayed only after the trigger switch has been activated.

2. Operation of the Preferred Embodiment

The present invention uses the display unit, and the optical image conversion unit associated with the image recording unit, to provide a more flexible field of view than can be achieved when the image of the sighting system is viewed without electronic modification. The electrical signals supplied to the display unit are modified by signals from the trajectory calculating microprocessor unit. The electrical display signals and the signals generated by this trajectory calculating microprocessor unit are combined by techniques known in the image display arts. It will be clear that part of the signal processing performed by the trajectory calculating microprocessor unit is to transform calculated points into a format consistent with the signals controlling the display unit. Thus, the impact point computed by the trajectory calculating microprocessor unit can be incorporated in the image provided by the display unit. The use of a display unit has the further advantage that a field of view image can be frozen on the display unit and the effect of changing parameters can be observed. Also, the display unit could be detached or repositioned at any convenient location, the user will no longer have to be positioned behind the scope at the optical focal point. In addition, the process of displaying the field of view permits enhancement of the optical image by improved optical sensors and by signal processing techniques.

The present invention, by virtue of the presence of the trajectory calculating microprocessor unit, the recording unit and sensor elements, can greatly enhance the operation of the sighting apparatus of the present invention as compared to the related art. For example, at least a portion of the trajectory calculating microprocessor unit's memory is removable in the preferred embodiment. This memory portion can hold information related to the characteristics of the projectiles discharged by the firearm. The characteristics can be in the form of parameters or programs that permit the projectile trajectory to be calculated by the trajectory calculating microprocessor unit, or can be in the form of tables that permit the projectile trajectory to be determined by the entry of certain conditions. In either situation, the replacability permits the sighting apparatus to be used with a wide variety of projectiles and firearms by using the correct data stored in the trajectory calculating microprocessor unit's memory. The magnification of the zoom lens, the configuration of the sighting apparatus relative to the rifle barrel (i.e., the direction of discharge of the projectile), the characteristics of the projectile, the distance of the target from the rifle, the elevation of the rifle as well as the environmental characteristics, such as wind velocity and direction, determine where the projectile will impact in the field of view of the zoom lens. These characteristics can be combined by the trajectory calculating microprocessor unit and a position of the impact point determined relative to the zero range reticle calibration This image point can be superimposed on the image presented to the operator as an impact-point reticle marker (or an indication can be given how the field of view must be corrected to include the impact point). In this manner, the operator can see the potential impact point if the trigger were activated and can consequently activate the trigger at an appropriate time in a first mode of operation. In a second mode of operation, the impact point will be displayed only after the trigger mechanism is activated, thus allowing comparison against result determined by the trajectory calculating microprocessor unit.

Figure 7B:
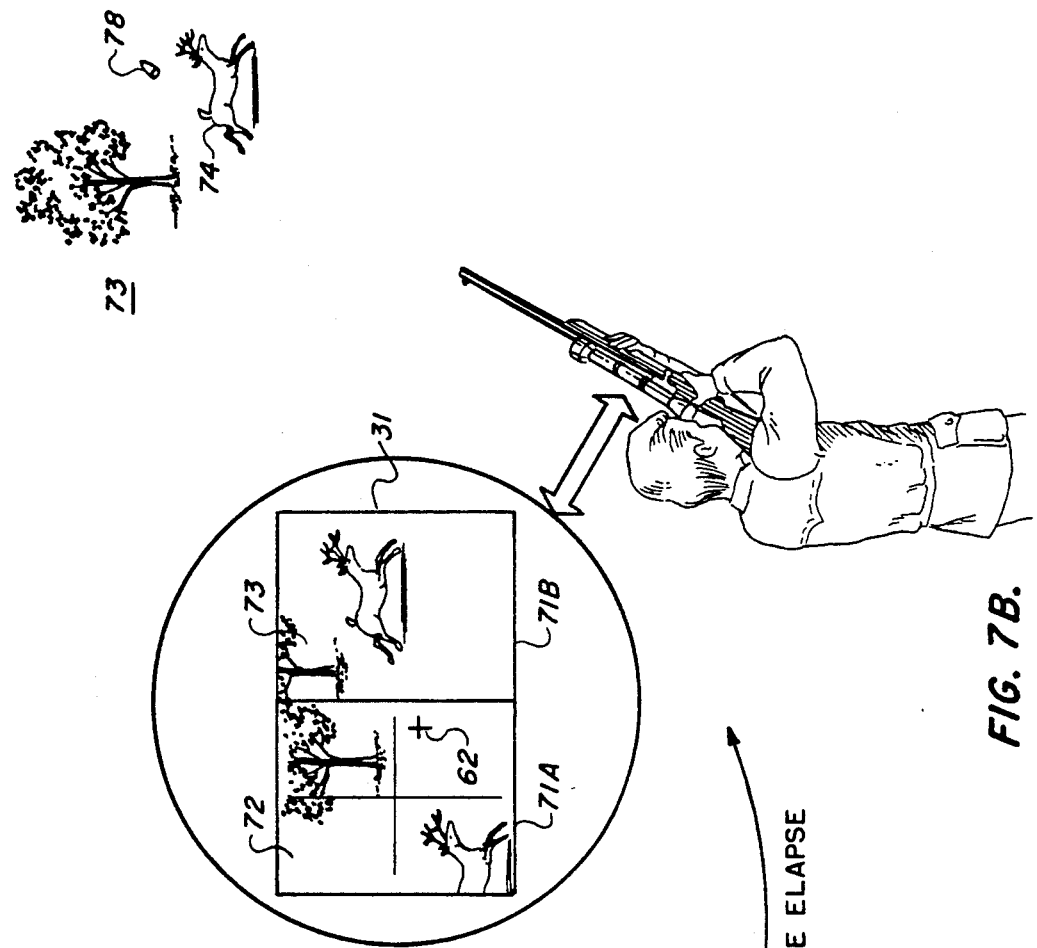
Figure 7A:
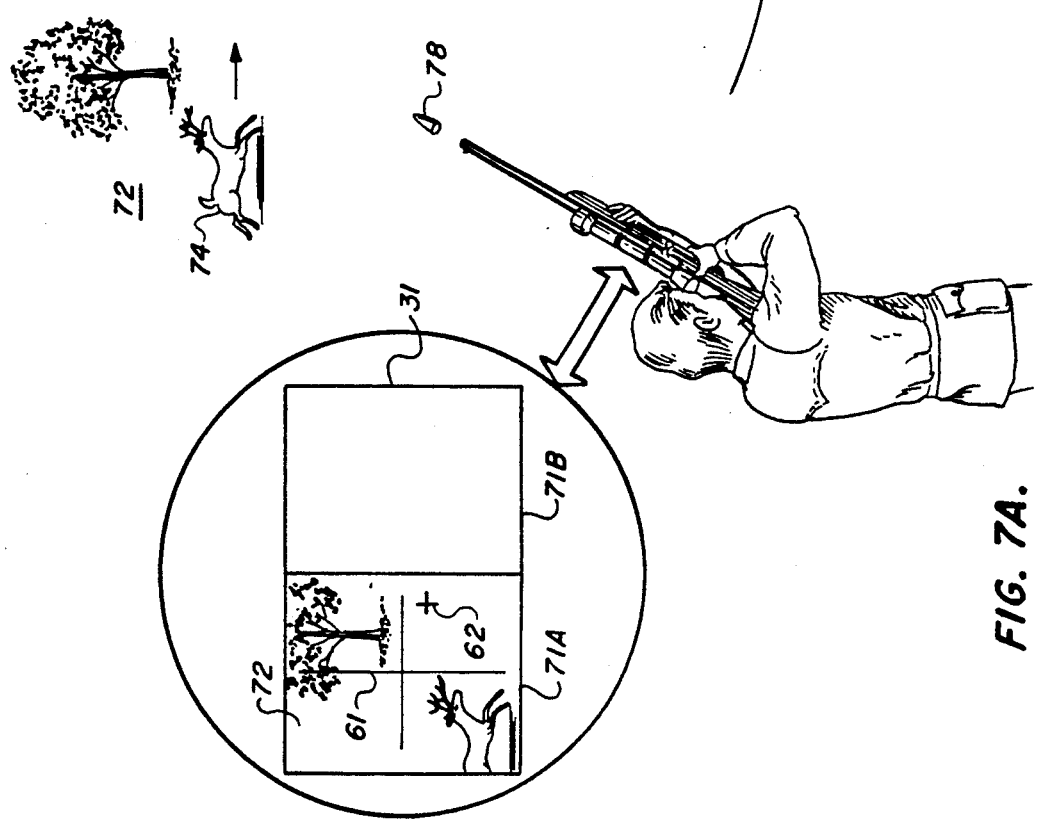

Referring to FIG. 7A and FIG. 7B, the use of the sighting apparatus to determine an impact point with respect to a moving target is illustrated. In FIG. 7A, when switch 26 is activated, the image presented to the operator is divided into image 72 projected on screen portion 71A and image 73 is projected on screen portion 71B. When the switch 26 is initially activated, no image is displayed on screen portion 71B (or the same image is displayed as is displayed on screen portion 71A). When switch 26 is activated and the switch 23 detects that the trigger has been activated, the image 72 is frozen, i.e., by means of the recording unit in conjunction with a frame grabber, the image being displayed along with the impact point computed by the trajectory calculating microprocessor unit. The image currently being acquired by the sighting apparatus is then imposed on the 71B portion of the screen. At the time that the trigger is activated, the microprocessor, activated by switch 26 computes the time that is required for the projectile to travel from the muzzle of the firearm to the impact point, i.e. the time of flight. The activation of the trigger causes timing apparatus to be activated and to be compared with the time of flight and when an equality is established, the image 73 is stored by the image recording unit using a frame grabber or similar device. By comparing identifiable stationary features of the two stored images, namely the tree in this representation in FIG. 7A and 7B, the position of the impact point relative to this stationary object, recorded on the image 72, can be located on image 73. In this manner, the impact of a projectile with respect to a moving target can be identified on image 71B.

The sighting apparatus of the present invention provides flexibility with respect to the mode of the operation. In particular, the incorporation of a recording unit as a component in the sighting apparatus permits a reviewable record of the result of discharging a projectile from the firearm with respect to stationary or moving targets. This record can be used as verification of successfully stalking game without injury to the game. Similarly, the availability of the record can be used in a training situation, i.e., a firearm user will be able to determine virtually all impact locations including the hits and misses. The availability of a trajectory calculating microprocessor unit permits more precise utilization of the multiplicity of variables that effect the trajectory and, consequently the impact point of the projectile discharged from the rifle or firearm.

The sighting apparatus of the present invention, when used with live ammunition, can be initially adjusted, as is normally done on a target ranging field, by insuring that the point of impact, relative to the zero range reticle cross-hairs, coincide at a known distance. Also, when, because of the projectile trajectory, the point of impact falls out of the field of view of the display unit, the zoom lens can be adjusted so that the point of impact falls within the field of view.

It will be clear that the impact point of a firearm projectile can be partially determined by the recoil of the firearm (i.e., the momentum imparted to the rifle as a result of the propulsion of the projectile). These parameters can be made available to the trajectory calculating microprocessor unit, either as a general correction factor or as an individualized correction factor, to provide a more accurate approximation to the impact point determination According to another mode of operation, a plurality of impact points can be displayed by the field of view. In this manner, the effect of using different cartridges can be immediately displayed. In this mode of operation, the microprocessor causes an identifier to be displayed with each impact point. Similarly, the effect of environmental characteristics on different cartridges can be immediately determined.

According to another embodiment of the invention, the image recording unit is similar to the commercially available video recorder/camera units. The principal modification is inclusion of apparatus for combining the electrical signals from the trajectory calculating microprocessor unit with the signals determined by the viewed image, i.e., signals used for displaying the viewed image on the display unit. It is also understood that only those portions of the commercially available video recorder/camera units that are absolutely essential need be located on the firearm: the zoom scope and optical image conversion unit.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. Apparatus for sighting a target for an actual or simulated firearm by means of simulating the impact point of a projectile discharged from the same, said apparatus comprising:
   a) trajectory calculating unit on or adjacent to said firearm programmed to calculate the effect of trajectory modifying conditions on a location of at least one projectile impact point in relationship to the zero-range reticle calibration;
   b) a display unit for displaying images;
   c) means for providing a zero-range reticle on a display unit image;
   d) an optical image conversion unit on said firearm for converting an optical image viewed by said optical image conversion unit to electronic signals, said optical image conversion unit sending said electrical signals to an appropriately interfaced display unit on or adjacent to said firearm, said display unit responsive to said electronic signals for displaying a field of view image;
   e) image means coupled to the display unit and responsive to said trajectory calculating unit for superimposing at least one impact point reticle on said field of view; and
      storage means for storing said electronic signals including electronic signals representing said reticle in response to activation of a firearm trigger, wherein said trajectory calculating unit determines a time of flight of said projectile after said firearm trigger activation, said storage means storing second field of view from said optical image conversion unit after a time equal to said time of flight.

2. The apparatus of claim 1 wherein said display unit displays said field of view with said reticle and said second field of view simultaneously, a comparison of said fields of view indicative of an accuracy of target acquisition.

3. The sighting apparatus of claim 2 further comprising a zoom lens for optically processing an image viewed by said optical image conversion unit, said zoom lens applying signals to said trajectory calculating unit indicative of a configuration of a field of view image of said zoom lens.

4. The sighting apparatus of claim 3 further comprising at least one sensor providing data related to environmental conditions to the trajectory calculating unit, said environmental conditions including the environment orientation of a bore sight alignment relative to an appropriate reference plane.

5. The sighting apparatus of claim 1 further comprising a range finder unit, said range finder unit supplying input signals to said trajectory calculating unit means indicative of a distance to a selected target object.

6. A sighting apparatus for use with a firearm, the sighting apparatus comprising:
   a recording unit, said recording unit including:
      image processing means for providing electrical signals representing an image acquired by said sighting apparatus,
      display means for displaying said image represented by said electrical signals, and
      storage means for storing said electrical signals representing said acquired image in response to activation of a firearm trigger;
   trajectory means coupled to said display means for providing second electrical signals modifying said image acquired by said sighting apparatus in response to input signals, said trajectory means providing impact electrical signals superimposing an impact point indicia on said acquired image displayed on said display means, said trajectory means determining a flight time to impact for an actual or simulated projectile following said firearm trigger activation; and
   timing means for storing electrical signals representing a second acquired image in said storage means, said second acquired image occuring a flight time after said firearm trigger activation, wherein comparison of said first and said second acquired image can determine whether said projectile impacts a selected target.

7. The sighting apparatus for use with a firearm of claim 6 wherein said trajectory means includes data storage means for storing data or a program to represent or calculate respectively the characteristics of at least one projectile.

8. The sighting apparatus for use with a firearm of claim 7 wherein said impact electrical signals provides indicia for a plurality of points of impact for each of a plurality of projectiles fired from said firearm.

9. The sighting apparatus for use with a firearm of claim 8 wherein said image processing means provides electrical signals that result in an enhanced image when applied to display means.

10. The sighting apparatus for use with a firearm of claim 9 wherein data can be manually entered into said trajectory means.

11. The sighting apparatus for use with a firearm of claim 10 further comprising:
   adjustment means for adjusting a spatial orientation between said sighting apparatus and said firearm; wherein said adjustment between said sighting apparatus and said firearm when using live ammunition is determined by superimposing the zero-range reticle point of said firearm with a true impact point of a projectile discharged from said firearm at a known distance under suitable environmental conditions.

12. The sighting apparatus for use with a firearm of claim 11 wherein said adjusting includes entering the zero-range distance data manually into said trajectory means.

13. The method for sighting a firearm, the method comprising the steps of:

converting an optical image of a firearm sighting field of view into electrical image signal when a firearm trigger is activated;

processing parameter data signals to determine trajectory electrical signals for a projectile fired from said firearm, said trajectory electrical signals determining a projectile impact point;

combining said image electrical signals and said trajectory electrical signals to provide combined electrical image signals;

storing said combined electrical image signals;

converting an optical image of said firearm sighting field into second electrical image signals at a time of projectile impact;

storing said second electrical image signals; and displaying a combined image provided by displaying said combined electrical image signals simultaneously with said second electrical image signals, a comparison of said combined image determining a firearm sighting accuracy.

14. The method for sighting a firearm of claim 13 wherein said processing step includes determining a distance to a target in said field of view.

15. The method for sighting a firearm of claim 14 wherein said processing step includes processing a program or stored parameters related to said projectile.

16. The method for sighting a firearm of claim 15 wherein, in said displaying step, said combined electrical image signals provides an image including an impact point relative to a moving target and a stationary reference object in said field of view at a time a projectile is discharged from said firearm and said second electrical image signals provides an image including said stationary reference point.

17. The method for sighting a firearm of claim 16 wherein said converting step includes providing electrical signals enhancing parameters of said optical image.

18. The method for sighting a firearm of claim 17 wherein said processing step includes processing signals from at least one environmental sensor element.

19. The method for sighting a firearm of claim 18 further comprising the step of calibrating said impact point by comparing an actual impact point of a discharged projectile with a displayed impact point, when using the sighting apparatus with an actual discharge of projectiles.

* * * * *